United States Patent
Lochmann

(10) Patent No.: US 10,281,041 B2
(45) Date of Patent: May 7, 2019

(54) PISTON BOLT

(71) Applicant: Mahle International GmbH, Stuttgart (DE)

(72) Inventor: Roland Lochmann, Marbach (DE)

(73) Assignee: Mahle International GmbH (DE)

( * ) Notice: Subject to any disclaimer, the term of this patent is extended or adjusted under 35 U.S.C. 154(b) by 191 days.

(21) Appl. No.: 15/286,314

(22) Filed: Oct. 5, 2016

(65) Prior Publication Data
US 2017/0097090 A1    Apr. 6, 2017

(30) Foreign Application Priority Data
Oct. 6, 2015 (DE) .................. 10 2015 219 265

(51) Int. Cl.
| | |
|---|---|
| *F16J 1/16* | (2006.01) |
| *F02F 3/00* | (2006.01) |
| *F16J 1/18* | (2006.01) |
| *F16B 7/06* | (2006.01) |
| *F16B 7/18* | (2006.01) |

(52) U.S. Cl.
CPC .................. *F16J 1/16* (2013.01); *F02F 3/00* (2013.01); *F16B 7/06* (2013.01); *F16B 7/182* (2013.01); *F16J 1/18* (2013.01)

(58) Field of Classification Search
CPC ....................... F16J 1/16; F16J 1/18
See application file for complete search history.

(56) References Cited

U.S. PATENT DOCUMENTS

| | | | | |
|---|---|---|---|---|
| 1,684,862 | A * | 9/1928 | Gay ............................ | F16J 1/16 384/271 |
| 3,702,092 | A * | 11/1972 | Zollner ....................... | F16J 1/16 403/154 |
| 3,984,152 | A * | 10/1976 | Haines ..................... | F16C 17/18 384/280 |
| 4,359,913 | A * | 11/1982 | Mahlke ....................... | F16J 1/16 403/150 |
| 4,461,595 | A * | 7/1984 | Mallas ........................ | F16J 1/16 123/193.6 |
| 4,756,240 | A * | 7/1988 | Mielke ........................ | F16J 1/16 403/150 |
| 7,603,944 | B2 * | 10/2009 | Nigro .......................... | F16J 1/16 92/187 |
| 2010/0154628 | A1* | 6/2010 | Porta ........................... | F16J 1/16 92/187 |

(Continued)

FOREIGN PATENT DOCUMENTS

| | | |
|---|---|---|
| DE | 10 48 752 B | 10/1957 |
| FR | 800 533 A | 7/1936 |
| JP | S63-28958 A | 2/1988 |

(Continued)

OTHER PUBLICATIONS

German Search Report for DE-102015219265.2, dated May 2, 2016.

(Continued)

*Primary Examiner* — Thomas E Lazo
(74) *Attorney, Agent, or Firm* — Fishman Stewart PLLC

(57) ABSTRACT

A piston bolt may include an axial opening and at least one reinforcement rib may be arranged on an inner surface of the opening. The at least one reinforcement rib may be helical in conformation or may include a plurality of reinforcement ribs forming a honeycomb pattern.

17 Claims, 2 Drawing Sheets

(56) References Cited

U.S. PATENT DOCUMENTS

2010/0232870 A1* 9/2010 Golya .................. F16J 1/16
                                                                                 403/150

FOREIGN PATENT DOCUMENTS

| JP | H01 97063 U   | 6/1989 |
| JP | H02 57763 A   | 2/1990 |
| JP | H06-8864 B2   | 2/1994 |
| JP | H06 212931 A  | 8/1994 |
| WO | 2011/082815 A1 | 7/2011 |

OTHER PUBLICATIONS

English abstract for JPH06-8864-B2.
European Search Report for EP Application No. 16191841.2 dated Jan. 31, 2017.
English translation of Abstract of JPH0257763 (A).
English translation of Abstract of JPH06212931.

* cited by examiner

PISTON BOLT

CROSS REFERENCE TO RELATED APPLICATIONS

This application claims priority to German Patent Application No. DE 10 2015 219 265.2, filed on Oct. 6, 2015, the contents of which are hereby incorporated by reference in their entirety.

TECHNICAL FIELD

The present invention relates to a piston bolt with an axial opening.

BACKGROUND

From U.S. Pat. No. 4,756,240 A there is known a piston bolt of this kind with an axial opening, wherein at least one reinforcement rib is arranged on an inner surface of the opening. This is supposed to achieve an optimization of the loads.

The piston bolt constitutes the force transmitting connection element between piston and connecting rod and is stressed by the gas and mass forces acting on it with bending as well as transverse ovalization, and also shearing in certain cross sections, under which both the piston bolt and the bolt bosses in the piston and in the connecting rod are elastically deformed. The contact surfaces of piston bolt and bolt bosses, often being cylindrical and parallel to each other in the load-free state, become curved and canted, so that local surface pressure peaks can occur. Together with the tensile stress acting in the circumferential direction of the bolt bosses, this constant stressing can exceed the fatigue strength of the piston material and result in fatigue cracks in the apex of the bolt bosses, so-called, boss gap cracks. To prevent this, low-deformation piston bolts are required, that is, bolts with large wall thickness, but this in turn runs counter to the desire for the lowest possible masses to be moved.

In general, it should be noted that, while the bending resistance is improved with axially running reinforcement ribs, this runs counter to the transverse ovalization of the bolt. On the contrary, with reinforcement ribs arranged in a ring, the resistance to transverse ovalization is improved, but the bending resistance is reduced. Thus, in both instances, only one of the two properties is improved, while the other one is worsened.

SUMMARY

The present invention therefore concerns itself with the problem of indicating an improved or at least an alternative embodiment for a piston bolt of this kind, which is distinguished by a weight optimization and a reduced bending and transverse ovalization.

This problem is solved according to the invention by the subject matter of the independent claims. Advantageous embodiments are the subject matter of the dependent claims.

The present invention is based on the general idea of providing, instead of the formerly known annular reinforcement ribs or axial reinforcement ribs, now for the first time at least one obliquely running reinforcement rib or a plurality of reinforcement ribs forming a honeycomb pattern. The piston bolt according to the invention has an axial opening in known manner for weight reduction, and at least one such reinforcement rib is disposed on an inner surface of this opening. This at least one reinforcement rib is helical in conformation, according to the invention, or according to a second alternative yet equivalent embodiment there is provided a plurality of reinforcement ribs, which form a honeycomb pattern. Thus, with the completely redesigned reinforcement ribs according to the invention, for the first time both an increased resistance to transverse ovalization and an increased bending resistance of the piston bolt is possible, which was not so with former reinforcement ribs running only in the axial direction or the circumferential direction. The reinforcement ribs furthermore increase the inner surface of the piston bolt, so that it can be better cooled and thus a better cooling of a piston bolt boss in the piston is also made possible. This also makes it possible in particular to enhance the operating reliability of an internal combustion engine outfitted with such a piston. Furthermore, the at least one helically configured reinforcement rib can promote a rotary movement of the piston bolt in the bolt bosses, which can prevent a so-called "stuck bolt" and thereby counteract a wearing on only one side.

In one advantageous modification of the solution according to the invention, the at least one reinforcement rib passes in the same direction through the opening, that is, either as a right-hand screw or as a left-hand helix. Alternatively, it is also conceivable to provide at least two helical reinforcement ribs running in opposite direction, which are distanced from each other in a middle region of the piston bolt and consequently do not touch each other there.

In another advantageous embodiment of the solution according to the invention in the second alternative, annular reinforcement ribs and axial reinforcement ribs are provided, which intersect and together form the honeycomb pattern. However, the annular and the axial reinforcement ribs need not be oriented absolutely in the axial direction or the circumferential direction, so that an orientation of the individual reinforcement ribs differing from this in regard to an angle is also possible, resulting in a rhomboidal honeycomb pattern. On the other hand, with exactly annular and exactly axial reinforcement ribs, one gets a rectangular honeycomb pattern. Thanks to the deviation from a right angle between the axial reinforcement ribs and the annular reinforcement ribs, one can influence the special loading requirements, and it is also conceivable of course for the reinforcement ribs forming the honeycomb pattern to vary in terms of their height and/or their width over the length of the opening and thereby create regions of different load bearing ability. Of course, smaller honeycombs, that is, reinforcement ribs lying more closely together, can also be provided in regions of greater loading.

In one advantageous modification of the solution according to the invention at least one reinforcement rib has a trapezoidal, a rectangular, a circular segment or sinusoidal cross section. In particular, a sinusoidal cross section constitutes a rounded cross section form, which is distinguished by a reduced notch effect.

In one advantageous modification of the solution according to the invention the at least one reinforcement rib can also be hardened, which is relatively easily possible on account of the enlarged surface of the at least one reinforcement rib in comparison to the inner surface of the opening.

In another advantageous embodiment of the solution according to the invention a ratio of a height h of the at least one reinforcement rib to a residual wall thickness R of the piston bolt is defined as follows: $0.1 < h/R < 2.0$ and preferably $0.3 < h/R < 0.7$. Such a ratio affords the major benefit that, with larger ribs, a better cooling of the piston bolt as well as the boss during operation can be achieved.

In another advantageous embodiment of the solution according to the invention a ratio of a height h of the at least one reinforcement rib to a width b of the reinforcement rib is defined as follows: $0.1<h/b<2.0$, preferably $0.1<h/b<0.3$. Of course, it is clear that both this ratio and the one mentioned in the previous paragraph can vary along the axial length of the piston bolt, where the described region affords benefits especially in regard to the rigidity of the piston bolt, since the broader the reinforcement ribs, the greater the rigidity of the piston bolt.

If the at least one reinforcement rib has a helical conformation, this can have a pitch angle between 0° and 90°, that is, a very flat pitch or a very steep pitch.

Other important features and benefits of the invention will emerge from the subclaims, the drawings, and the corresponding description of the figures with the help of the drawings.

Of course, the above mentioned features and those yet to be explained below can be used not only in the particular indicated combination, but also in other combinations or standing alone, without leaving the scope of the present invention.

Preferred sample embodiments of the invention are represented in the drawings and shall be explained more closely in the following description, where the same reference numbers refer to the same or similar or functionally equal parts.

BRIEF DESCRIPTION OF THE DRAWINGS

There are shown, each time schematically

DETAILED DESCRIPTION

Figure 1:
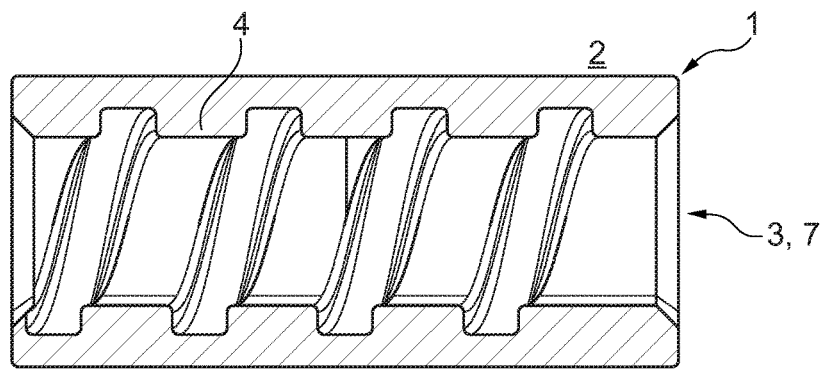
FIG. 1 is a cross-sectional illustrative representation through a piston bolt according to the invention with an axial opening and a helical reinforcement rib running through it in the same direction.

According to FIGS. 1 to 7, a piston bolt 1 according to the invention which usually couples a piston, not shown, to a connecting rod in an internal combustion engine 2, comprises an axial opening 3, on whose internal surface at least one reinforcement rib 4 is disposed. Now, according to the invention, this at least one reinforcement rib 4 is helical in conformation (see FIGS. 1 to 3 and 5 and 6), or it is provided with a plurality of such reinforcement ribs 4 which form a honeycomb pattern 5 (see FIG. 7).

Figure 2:
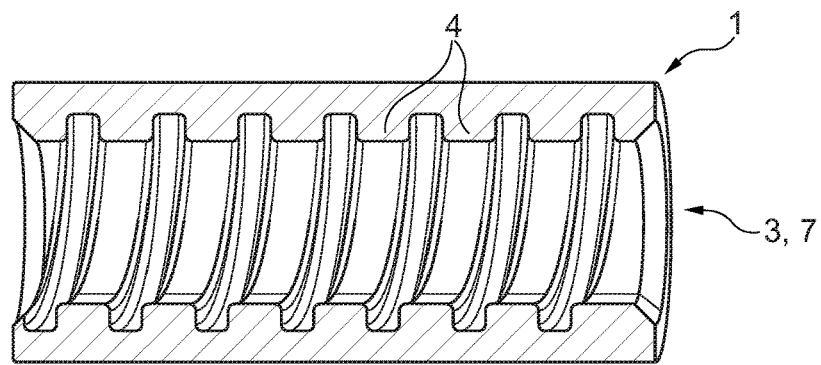
FIG. 2 is a representation like FIG. 1, but with reduced thread height of the reinforcement rib.
Figure 3:
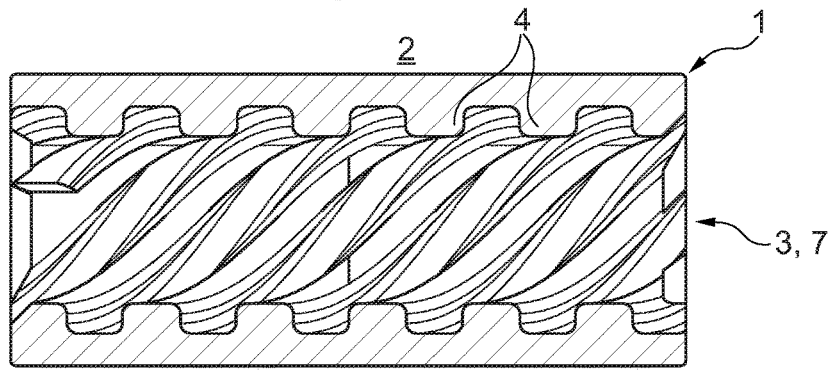
FIG. 3 is another embodiment of the helical reinforcement rib running through in the same direction.
Figure 4:
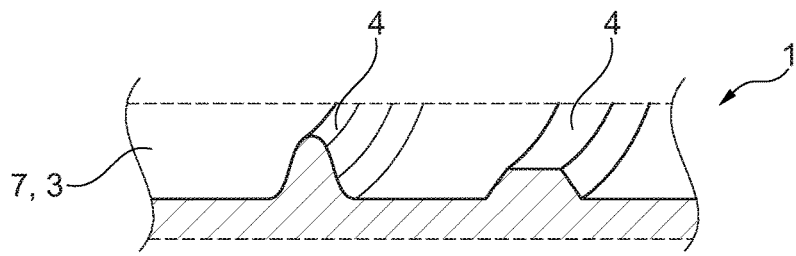
FIG. 4 illustrates exemplary possible cross section forms of reinforcement ribs.
Figure 5:
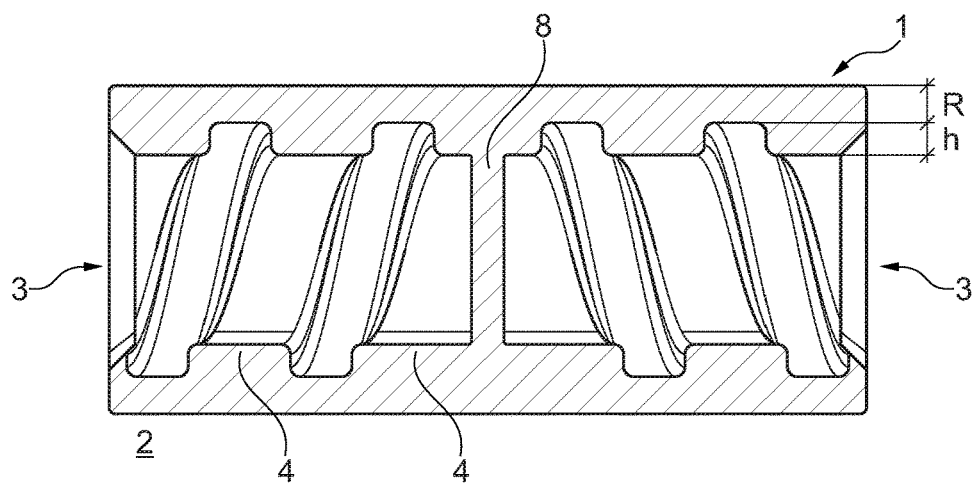
FIG. 5 is an illustrative embodiment of the piston bolt according to the invention with two helical reinforcement ribs running in opposite direction.
Figure 6:
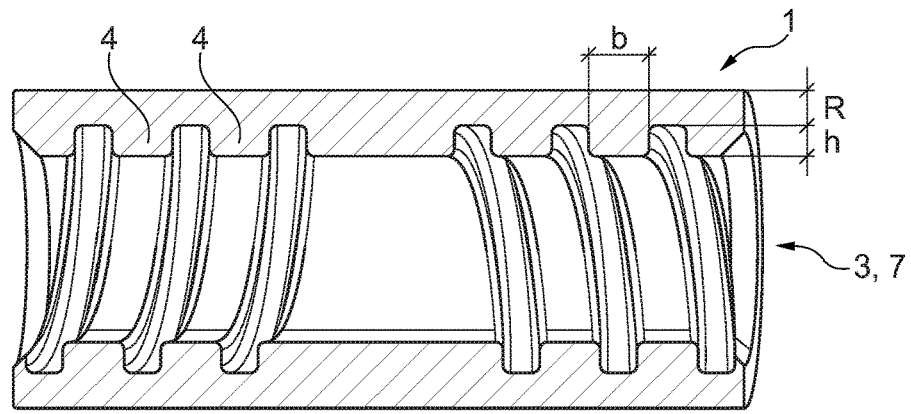
FIG. 6 is a representation like FIG. 5, but with reduced thread height.

The at least one reinforcement rib 4 can be configured as a helical reinforcement rib and it can run uniformly through the opening 3, as shown in the embodiments per FIGS. 1 to 3. Alternatively, it is also conceivable to provide two or more helical reinforcement ribs 4 running in opposite direction, as is shown in FIGS. 5 and 6.

Regarding the opening 3, one can imagine it to be fashioned as a continuous opening 7 running entirely through the piston bolt 1 or that a middle web 8 is present, which separates two openings 3 from each other, each one formed as a blind hole. Such a middle web 8 is shown, for example, in FIG. 5.

Figure 7:
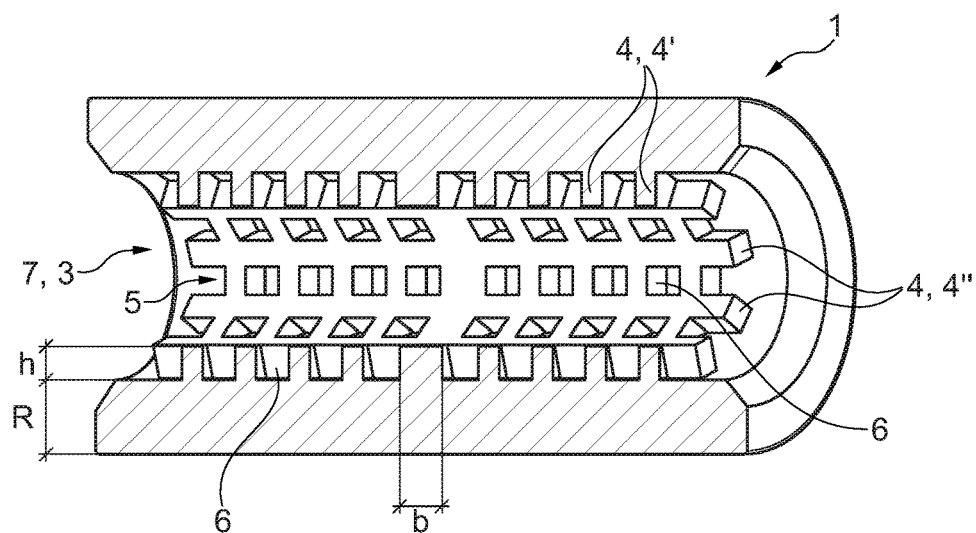
FIG. 7 is a second alternative embodiment of the piston bolt according to the invention with a plurality of reinforcement ribs forming a honeycomb pattern.

If one considers the honeycomb pattern 5 formed by the reinforcement ribs 4 per FIG. 7, one notices that annular reinforcement ribs 4' and axially running reinforcement ribs 4" are provided to form the honeycomb pattern 5. The reinforcement ribs 4', 4" forming the honeycomb pattern 5 can of course vary in terms of their height h and/or in terms of their width b along the length of the opening 3, which can be formed for example by honeycombs 6 of different size and/or different spacings between the individual honeycombs 6, so that the honeycomb pattern 5 can be designed for the individual loads according to the regions of the piston bolt 1.

In the individual reinforcement ribs 4 according to FIGS. 1 to 3 and 5 to 7 one notices that they substantially have a rectangular cross section with partly rounded corners. Alternatively, it is also conceivable that at least one reinforcement rib 4 has a trapezoidal or a sinusoidal cross section, as is shown for example with the reinforcement ribs 4 of FIG. 4. Furthermore, the reinforcement ribs 4 can be hardened, which is possible with no problems on account of the enlarged surface of the reinforcement ribs 4 by means of a faster cooldown process.

In one advantageous modification of the solution according to the invention, a ratio of the height h of at least one reinforcement rib to a residual wall thickness R of the piston bolt 1 can be defined as follows:

$0.1<h/R<2.0$ and preferably $0.3<h/R<0.7$.

Furthermore, a ratio of a height h of the at least one reinforcement rib 4 to a width b of same can be defined as follows:

$0.1<h/b<1.0$, preferably $0.1<h/b<0.3$.

In the size ratios given, an optimal compromise can always be achieved between h, R and b (height, residual wall thickness and width), so that the strength, the deformation behaviour and the weight can be influenced. One benefit of the invention specified here is therefore that the piston bolt 1 can be designed according to requirements by appropriate adaptation of the three parameters h, R, b (and material).

The reinforcement ribs 4 configured according to the invention can heighten both a bending resistance and a resistance to transverse ovalization, and at the same time reduce the weight of the piston bolt 1, so that the moved mass can be reduced and at the same time the load bearing ability can be increased.

The reinforcement ribs 4 can be produced, for example, by a machining of the inner surface, by a cold flow process, or a pressing with interior mould, while in particular the production of the honeycomb pattern 5 with the individual honeycombs 6 is also possible by using certain salt or sand cores. Such a honeycomb pattern can preferably also be accomplished by a metal injection moulding process (metal-matrix compound). This makes possible high precision with low tolerances (e.g., an application for internal gears). Depending on the choice of material and the composition, the hardness, thermal conductivity, and so on can thus also be adjusted.

The invention claimed is:

1. A piston bolt comprising an axial opening and at least one reinforcement rib arranged on an inner surface of the opening, wherein:

the at least one reinforcement rib is helical in conformation and includes at least two helical reinforcement ribs having helix angles oriented in opposing directions.

2. The piston bolt according to claim 1, wherein the at least two helical reinforcement ribs run in opposite directions.

3. The piston bolt according to claim 1, wherein the at least one reinforcement rib has one of a trapezoidal, a rectangular, a circular segment, and a sinusoidal cross section.

4. The piston bolt according to claim 1, wherein a ratio of a height of the at least one reinforcement rib to a residual wall thickness of the piston bolt is between 0.1 and 2.0.

5. The piston bolt according to claim 4, wherein a ratio of a height of the at least one reinforcement rib to a residual wall thickness of the piston bolt is between 0.3 and 0.7.

6. The piston bolt according to claim 1, wherein a ratio of a height of the at least one reinforcement rib to a width of the reinforcement rib is between 0.1 and 2.0.

7. The piston bolt according to claim 6, wherein a ratio of a height of the at least one reinforcement rib to a width of the reinforcement rib is between 0.1 and 0.3.

8. The piston bolt according to claim 1, wherein one of:
the opening is formed as a continuous opening running entirely through the piston bolt, or
a middle web is present, which separates two openings from each other, each one formed as a blind hole.

9. An internal combustion engine comprising at least one piston bolt having an axial opening and at least one reinforcement rib arranged on an inner surface of the opening, wherein
the at least one reinforcement rib includes a plurality of reinforcement ribs forming a honeycomb pattern.

10. The internal combustion engine according to claim 9, wherein the plurality of reinforcement ribs forming the honeycomb pattern vary in terms of at least one of height and width over a length of the opening.

11. The internal combustion engine according to claim 9, wherein the at least one reinforcement rib has one of a trapezoidal, a rectangular, a circular segment, and a sinusoidal cross section.

12. The internal combustion engine according to claim 9, wherein one of:
the opening is formed as a continuous opening running entirely through the piston bolt, or
a middle web is present, which separates two openings from each other, each one formed as a blind hole.

13. The internal combustion engine according to claim 9, wherein the plurality of reinforcement ribs includes annular reinforcement ribs and axial reinforcement ribs, which intersect and together form the honeycomb pattern.

14. The internal combustion engine according to claim 9, wherein the plurality of reinforcement ribs forming the honeycomb pattern vary in terms of at least one of height and width over a length of the opening.

15. A piston bolt comprising an axial opening and at least one reinforcement rib arranged on an inner surface of the opening, wherein:
the at least one reinforcement rib includes a plurality of reinforcement ribs including annular reinforcement ribs and axial reinforcement ribs, which intersect and together to form a honeycomb pattern.

16. The piston bolt according to claim 15, wherein the plurality of reinforcement ribs forming the honeycomb pattern vary in terms of at least one of height and width over a length of the opening.

17. The piston bolt according to claim 15, wherein the at least one reinforcement rib has one of a trapezoidal, a rectangular, a circular segment, and a sinusoidal cross section.

* * * * *